United States Patent

Jackson

[11] Patent Number: 6,034,668
[45] Date of Patent: Mar. 7, 2000

[54] CURSOR CONTROL DEVICE

[75] Inventor: Robert E. Jackson, Rolling Hills Estates, Calif.

[73] Assignee: Altra, Rawlins, Wyo.

[21] Appl. No.: 08/852,524

[22] Filed: May 7, 1997

[51] Int. Cl.[7] .................................................. G09G 5/08
[52] U.S. Cl. ..................... 345/157; 345/158; 345/159; 345/160; 345/165; 341/13
[58] Field of Search ........................... 345/157, 158, 345/159, 160; 341/13; 250/273 R, 237 G, 231.13, 231.18; 356/35 G; 239/566–575; 350/237.6; 235/494

[56] References Cited

U.S. PATENT DOCUMENTS

| | | | |
|---|---|---|---|
| 3,553,470 | 1/1971 | Dench | 250/237 G |
| 4,581,603 | 4/1986 | Ingold et al. | 340/365 |
| 4,782,327 | 11/1988 | Kley et al. | 341/2 |
| 4,935,728 | 6/1990 | Kley | 345/161 |
| 5,357,094 | 10/1994 | Baldwin | 235/490 |
| 5,704,037 | 12/1997 | Chen | 345/184 |
| 5,760,764 | 12/1995 | Martinelli | 345/160 |

FOREIGN PATENT DOCUMENTS 84205829  11/1996  Taiwan .
WO 96 36915  11/1996  WIPO .

OTHER PUBLICATIONS

"Switch Debounce Logic", IBM Technical Disclosure Bulletin, vol. 22, No. 8b, Jan. 1980, pp. 3749–3750, New York, USA.

Patent Abstracts of Japan, vol. 009, No. 185 (E–332), Jul. 31, 1985.

*Primary Examiner*—Steven J. Saras
*Assistant Examiner*—Fritz Alphonse
*Attorney, Agent, or Firm*—McCutchen, Doyle, Brown & Enersen, LLP

[57] ABSTRACT

The present invention relates to computer control devices and, more particularly, to devices for controlling the position of a cursor on a computer display. The invention permits improved technology for cursor control devices. Certain embodiments of devices according to the present invention offer an edge detection system that uniquely identifies the maximum and minimum edges for use in a cursor control device, utilizing improved grating plates. Certain embodiments offer more reliable switch cycle detection in a cursor control device.

8 Claims, 1 Drawing Sheet

CURSOR CONTROL DEVICE

FIELD OF THE INVENTION

The present invention relates to computer control devices and, more particularly, to devices for controlling the position of a cursor on a computer display.

BACKGROUND OF THE INVENTION

A wide variety of techniques for positioning a cursor on a computer display are available and well known in the computer industry. Conventional cursor control devices include, for example, mice, track balls, touch screens, joy sticks, and light pens. Cursor control devices are also commonly referred to as pointing devices, as they allow a user to select (or "point to") a specific location on a computer screen.

Conventional cursor control devices generally suffer from one or more deficiencies. For example, many cursor control devices, such as a typical mouse, require the user to move his or her hand across large areas to operate efficiently and permit movement of the cursor throughout the display area. Often, a user's workspace is limited, and the user must repeatedly lift, move and set down the mouse in order to move the cursor across the screen. In such situations, use of a mouse is inconvenient and frustrating. It can also lead to physical fatigue and repetitive stress injuries.

In order to overcome many of the disadvantages of conventional cursor control devices, improved cursor positioning devices have been developed, such as the patented FELIX™ devices produced by Altra Corporation. Devices of this type are disclosed in U.S. Pat. Nos. 4,782,327, issued on Nov. 1, 1988 and 4,935,728, issued on Jun. 19, 1990; these patents are hereby incorporated by reference in their entirety (and referred to herein as the "Kley Patents"). Devices such as Altra's FELIX™ device permit comfortable movement of a cursor using finger, not wrist or arm, movements. These devices allow for great precision of movement and, in many cases, a cursor can be moved across an entire computer screen by moving a finger less than one square inch.

Recently, attempts have been made to improve further the effectiveness of devices such as those described in the Kley Patents. For example, Taiwan U.M. Application No. 84205829 (Publication No. 283506) (hereinafter referred to as the "Taiwan Application"), describes a mechanical optical absolute coordinate cursor control device claimed to provide advantages over the prior art. A rough translation of the specifications and claims of the Taiwan Application, along with relevant drawings, is attached as Appendix A and fully incorporated herein by reference.

It will be apparent to those skilled in the art that the Taiwan Application describes mainly well-known technology, contains numerous flaws, and fails to provide technical support for advantages claimed in the application. For example, as part of the described mechanical optical control device, the Taiwan Application describes the use of optical grating plates to detect position changes, a technique which is well known in the art. In the Taiwan Application, however, the grating plates are configured in upper and lower rows with a 90 degree phase displacement between the rows. The Taiwan Application erroneously asserts that use of the grating plates as described in the Taiwan application permits the unique detection of the minimum and maximum values at the two end boundaries. In fact, this claim is false, and the Taiwan Application fails to provide a disclosure that would enable the relevant claims or advantages. Accordingly, there is a need for inventive improvements to the well known technology described in the Taiwan Application to permit the technology to function properly.

In addition to the problems of the device described in the Taiwan Application, prior art pointing devices in general also exhibit many other deficiencies. For example, most pointing devices employ switches, such as the switches operated (i.e., opened or closed) when a user "clicks on" a particular point on the display to select that point for further operations. Detection of state changes in a switch by digital means, however, is often unreliable due to detection of false switching cycles. This problem, for example, can lead to difficulties in distinguishing "double-clicks" from "single clicks." The difficulty is that "on-off-on" or "off-on-off" activity may be erroneously detected, when in reality the switch is simply bouncing as a result of changing state once, from "on" to "off" or from "off" to "on." All switches will, to some extent, exhibit such behavior (called switch bounce).

Accordingly, there is a need for an improved cursor control device that eliminates disadvantages associated with prior art devices generally and with the device described in the Taiwan application in particular.

SUMMARY OF THE INVENTION

The present invention permits improved technology for cursor control devices. Certain embodiments of devices according to the present invention offer an improved edge detection system for use in a cursor control device, utilizing improved grating plates. Certain embodiments offer more reliable switch cycle detection in a cursor control device.

One object of the present invention is to provide an improved cursor control device.

Another object of the present invention is to provide an improved edge detection system for use in a cursor control device.

Still another object of the present invention is to provide improved grating plates for use in a cursor control device.

Yet another object of the present invention is to provide more reliable switch detection in a cursor control device.

Other objects, advantages and features of the present invention will be apparent to those skilled in the art based on the following detailed description and the accompanying drawings.

DETAILED DESCRIPTION OF PREFERRED EMBODIMENT(S)

In certain preferred embodiments of the present invention, a cursor control device has an optical position detection system that, in a conventional manner, is based on the use of optical gratings. The use of an inventive type of optical grating system to improve a cursor control device will be described herein. The use of optical gratings in general is well known in the art and will not be described in detail here. In accordance with the present invention, cursor control devices utilize the improved optical grating systems to permit an improved edge detection system, as described further herein.

In addition, certain preferred embodiments of the present invention also utilize an improved switch debounce system. Such embodiments have fewer problems associated with detection of false cycles, as described further herein.

Improved Grating Arrangement

Figure 1:
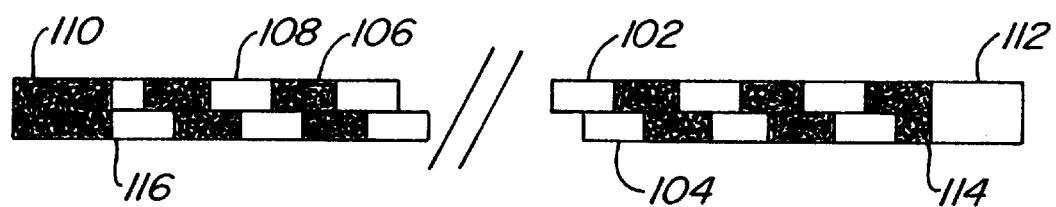
FIG. 1 shows a non-functional grating as described in the Taiwan Application.
Figure 2:
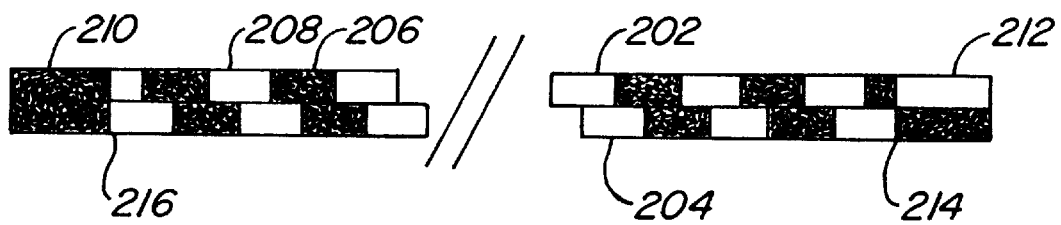
FIG. 2 shows an improved grating according to the present invention.

FIG. 1 shows a grating as described in FIG. 3D of the Taiwan Application. FIG. 2 shows an improved, inventive grating that eliminates certain error condition which would occur if the grating shown in FIG. 1. were used.

In both FIG. 1 and FIG. 2, the gratings are configured to have upper rows (rows 102 and 202, in FIGS. 1 and 2, respectively) and lower rows (rows 104 and 204, in FIGS. 1 and 2, respectively).

In discussing FIGS. 1 and 2, the gratings are represented as (a,b) where a =0 if the upper segment (or "square") is black (squares 106 and 206 in FIGS. 1 and 2, respectively) and a=1 if the upper square is white (squares 108 and 208 in FIGS. 1 and 2, respectively). Similarly, b=0 if the lower square is black and b=1 if the lower square is white. For example, reading from left to right, the gratings shown in each figure start with the sequence: (0,0), (0.0), (0.0), (1,1), (0,1) (0,0), (1,0), (1,1). In normal sequencing of such gratings, adjacent columns differ by only one entry, a or b, as typified by the third through seventh entries of the previously specified sequence. If two changes are detected, such as (0,0)→(1,1) or (0,1)→(1,0), one knows that an error or unusual condition exists.

The black and white squares described above are optically distinguishable and, therefore, conventional technology can be used to distinguish light coming from a black square and light coming from a white square. It will be apparent to those skilled in the art, based on the present disclosure, that embodiments of the present invention exist in which the squares, rather than being white and black, have another set of optically distinguishable characteristics such that the squares can represent two distinct logical states (e.g., "1" and "0"). It will also be apparent to those skilled in the art, based on the present disclosure, that embodiments exist in which the optical segments have a shape different from a square.

The Taiwan Application asserts that the use of the grating shown in FIG. 1 will permit the unique detection of the minimum (left) edge, shown at 110, or the maximum (right) edge, shown at 112, by noting the unusual sequences (1,1) →(0,0) at the minimum edge and (0,0)→(1,1) at the maximum edge. This, of course, is simply not true. The sequence (1,1)→(0,0) occurs both upon entering the minimum edge and upon leaving the maximum edge, as shown at points 116 and 114 in FIG. 1. Similarly, the sequence (0,0)→(1,1) occurs on leaving the minimum edge as well as entering the maximum edge.

In gratings according to the present invention, as shown in FIG. 2, this problem is eliminated. This improved grating arrangement will permit the unique detection of the minimum and maximum edges, shown at 210 and 212, respectively. As one can see from FIG. 2, the minimum edge is uniquely detected by the sequence (1,1)→(0.0), upon entering the minimum edge at point 216, and the sequence (0,0)→(1,1), upon leaving the minimum edge at point 216. Also, the maximum edge is uniquely detected by the sequence (0,1)→(1,0), upon entering the maximum edge at point 214, and the sequence (1,0)→(0,1), upon leaving the maximum edge at point 214. Since these four unusual sequences are found nowhere else in the grating shown in FIG. 2, and there are only four unusual sequences, all such sequences have been accounted for and no error condition can exist.

A modification of the program presented in FIG. 8 of the Taiwan Application should suffice. For example, the following transition-to-action list may be used.

TABLE 1

| OLD (a,b) | NEW (a,b) | ACTION (on position counter) |
|---|---|---|
| 0,0 | 0,0 | NONE |
| 0,0 | 0,1 | DECREMENT |
| 0,0 | 1,0 | INCREMENT |
| 0,0 | 1,1 | SET TO ONE |
| 0,1 | 0,0 | INCREMENT |
| 0,1 | 0,1 | NONE |
| 0,1 | 1,0 | SET TO MAX |
| 0,1 | 1,1 | DECREMENT |
| 1,0 | 0,0 | DECREMENT |
| 1,0 | 0,1 | SET TO MAX-1 |
| 1,0 | 1,0 | NONE |
| 1,0 | 1,1 | INCREMENT |
| 1,1 | 0,0 | SET TO ZERO |
| 1,1 | 0,1 | INCREMENT |
| 1,1 | 1,0 | DECREMENT |
| 1,1 | 1,1 | NONE |

Using Table 1, all possible transitions are acounted for and a unique action is specified. Thus, in this case, moving the puck to any corner will correctly initialize the counters. The decoding is performed based on the four bit code indicated in the above.

Improved Switch Debounce Circuitry

As noted above, most pointing devices employ switches, such as the switches operated (i.e., opened or closed) when a user "clicks on" a particular point on the display to select that point for further operations. Detection of switch motion by digital means, however, is often unreliable due to detection of false switching cycles. It is therefore important to eliminate this problem, that is the problem of detecting off-on-off or on-off-on activity when in reality the switch is simply bouncing as a result of changing state from on to off or off to on.

All switches, to some extent, exhibit such behavior (called switch bounce). An electronic technique of feeding two signals from the switch (normally closed (NC) and normally opened (NO)) to an RS flip-flop is widely used for debouncing switches. This technique is quite reliable if the switch is a break before make switch, but also quite expensive. The desirable arrangement is to receive a single switch contact into the digital computer and process the switch signal digitally. This not only reduces the cost of the switch (since only a NC contact is required) but eliminates the RS flip-flop at the expense of a more complicated program. A switch will bounce from when it changes state for a period of time of 4 milliseconds to perhaps 50 milliseconds depending on the type of switch. During this period of time the switch signal will appear to cycle.

According to conventional sampling theory, a bandlimited signal must be sampled at a rate at least twice the maximum frequency in the signal in order to be able to reconstruct the signal. A digital signal is usually conceptualized as a square wave, and therefore has a very wide frequency content. For digital signals, according to conventional sampling theory, the sample period (2/rate) must be less than the minimum state period in order to be able to reconstruct the signal. If the sampling period is too long, some short duration states will be lost or undetected. For reconstructing switch data, therefore, one ideally desires to sample at a slow enough rate so that the more or less high frequency switch bounce data is lost while the actual switch cycle data is retained. The challenge is to make sure that the sample rate is exactly slow, and fast, enough. A NO (normally open) switch is also generally required.

In the present invention, the sampling period is made longer than the maximum switch bounce time for the particular switch used. This alone, however, does not guarantee that a particular switch state is sampled at least twice which is necessary if sampling theory is to be used correctly to eliminate the high frequency switch bounce noise. In order to ensure that a switch state is sampled twice in the present invention, a switch state is considered "valid" if two successive samples are the same. A switch is considered to have changed state if two successive "valid" switch samples differ. The concept of a "valid" switch sample forms the basis for this aspect of the present invention and ensures that a switch state is sampled twice.

It is worth noting that a large amount of storage may be required if each switch is treated individually. It is not necessary, however, to create valid samples for each switch. It is only necessary to create valid samples of the switch ensemble. Even then, excessive storage may be required, since storage is needed to detect valid switch states as well as switch state changes. A method of consolidation of storage for use in a conventional switch debounce routine is set forth below as part of Subroutine !0; one byte is used to store valid switch data as well as previous state data.

It is worth noting that the use of the particular property of the exclusive-or function is a novel feature as applied to switch conditioning in a pointing device.

only. The invention is not limited to the described embodiments and shall be defined solely by the claims.

I claim:

1. An optical grating for use in a cursor control device, comprising:
    a first row having two or more types of optical segments, wherein a first type of optical segment represents a first logical state and a second type of optical segment represents a second logical state;
    a second row of optical segments, the second row having optical segments of the first type and optical segments of the second type, wherein the first row and the second row are approximately equal in length, and wherein the second row is disposed adjacent to the first row such that a first end of the first row is adjacent to a first end of the second row and a second end of the first row is adjacent to a second end of the second row;
    wherein the optical segments at the first ends of the first and second rows are both of the first type, and further wherein the optical segments at the second ends of the first and second rows are, respectively, of the second and first types.

2. The optical grating of claim 1, wherein the segments are square.

3. The optical grating of claim 1, wherein the first type of segment is black and the second type of segment is white.

4. A mechanical-optical cursor control device employing an optical grating to determine the position of a cursor, wherein the optical grating comprises:
    a first row having two or more types of optical segments, wherein a first type of optical segment represents a first Subroutine 10

```
;SWITCH PROCESSING - MAKES USE OF FACT A.EOR.B.EOR.A=B
;SWITCH VALUES ARE RETAINED AS NIBS (4 BITS) CONSISTING
;OF LS,RS,CS,O. CSW HOLDS 2 NIBS OSW (MSN) THE CURRENTLY
;ACCEPTED VALUE OF THE SWITCHES AND LSW (LSN) THE LAST
;SAMPLED VALUE OF THE SWITCHES.
GTSW1   BSF     FLG.F5      ;PREVENT XMIT
        BTFSC   SCT.7       ;TIME TO SAMPLE? (20MS)
        RETLW   0H          ;NO-EXIT
;
        MOVLW   -.24&OFFH   ;24 XMIT CYCLES
        MMOVWF  SCT ;       RESET TIMER
        BCF     FLG,F5      ;AND ALLOW XMIT
;
;NOW GET SWITCHES
        MOVF    PTC.0       ;W{3,2,1}:LS-,RS-,CS-
        XORLW   00EH        ;W{3,2,1}:LS,RS,CS (TRASH +NSW)
        XORWF               CSW.O
        ANDLW   00EH        ;W{3,2,1,0}:NSW.EOR.LSW
        BTFSC   ST,Z        ;NSW=LSW?
        GOTO    GTSW2       ;YES - VALID SWITCHES
        XORWF   CSW.1       ;CSW:OWS:NSW (=NSW.EOR.LSW.EOR.LSW)
        RETLW   0H          ;AND EXIT
;
;ENTER HERE WITH LSW = NSW VALID DEBOUNCED SWITCHES
GTSW2   SWAPF   CSW,0       ;GET NSW TO OSW POSITION
        XORWF               CSW.0;CHANGE IN POSITION
        ANDLW   0E0H        ;W{7,6,5}:OSW.EOR.NSW
        BTFSC   ST,Z
        RETLW   0h          ;NO
        XORWF               CSW.1;0SW:NSW PRESERVE CSW {4,3,2,1,0}
        BSF     FLG.F4          ;INDICATE A CHANGE
        RETLW   0h          ;AND EXIT
```

The present invention has been described in connection with certain preferred embodiments for illustrative purposes logical state and a second type of optical segment represents a second logical state;

a second row of optical segments, the second row having optical segments of the first type and optical segments of the second type, wherein the first row and the second row are approximately equal in length, and wherein the second row is disposed adjacent to the first row such that a first end of the first row is adjacent to a first end of the second row and a second end of the first row is adjacent to a second end of the second row;

wherein the optical segments at the first ends of the first and second rows are both of the first type, and further wherein the optical segments at the second ends of the first and second rows are, respectively, of the second and first types.

5. The cursor control device of claim 4, wherein the segments are square.

6. The cursor control device of claim 4, wherein the first type of segment is black and the second type of segment is white.

7. A cursor control device, comprising:

a cursor positioning system for positioning a cursor on a computer screen; and a switch for selecting the current position of the cursor for further operations, the state of the switch being sampled periodically, wherein the sampling period is longer than the maximum bounce time for the switch, and further wherein each detected switch state is sampled at least twice and a switch state is considered "valid" only if two successive samples are the same.

8. The cursor control device of claim 7, wherein the switch is considered to have changed state if two successive "valid" switch states differ.

* * * * *